Sept. 24, 1940.　　　O. D. TAYLOR　　　2,216,103
BREAD SLICING MACHINE
Filed Nov. 28, 1938　　　4 Sheets-Sheet 1

Inventor:
ORLIN D. TAYLOR

By A. G. Burns
Attorney

Sept. 24, 1940.　　　　O. D. TAYLOR　　　　2,216,103
BREAD SLICING MACHINE
Filed Nov. 28, 1938　　　　4 Sheets-Sheet 2
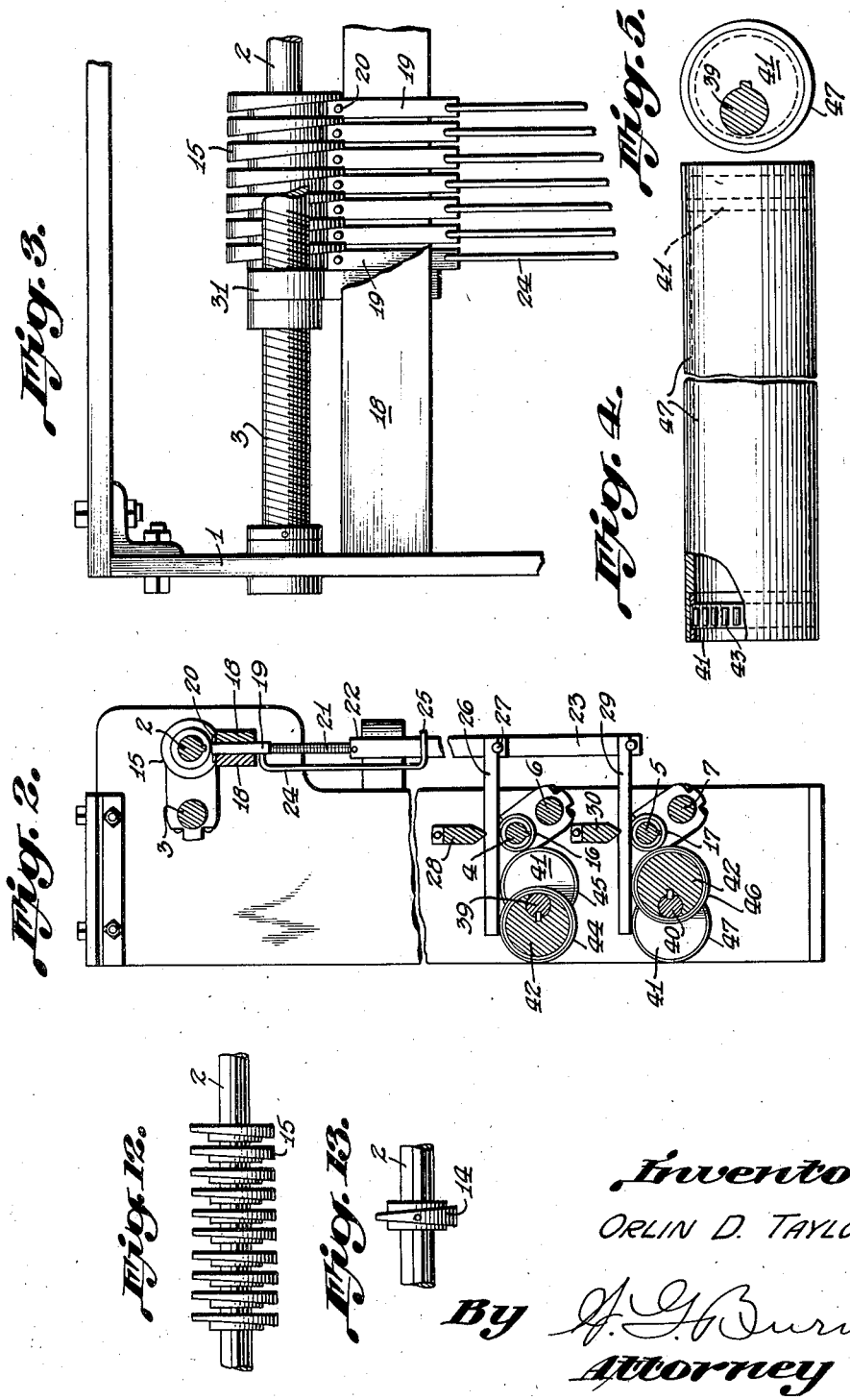

Sept. 24, 1940. O. D. TAYLOR 2,216,103
BREAD SLICING MACHINE
Filed Nov. 28, 1938 4 Sheets-Sheet 3
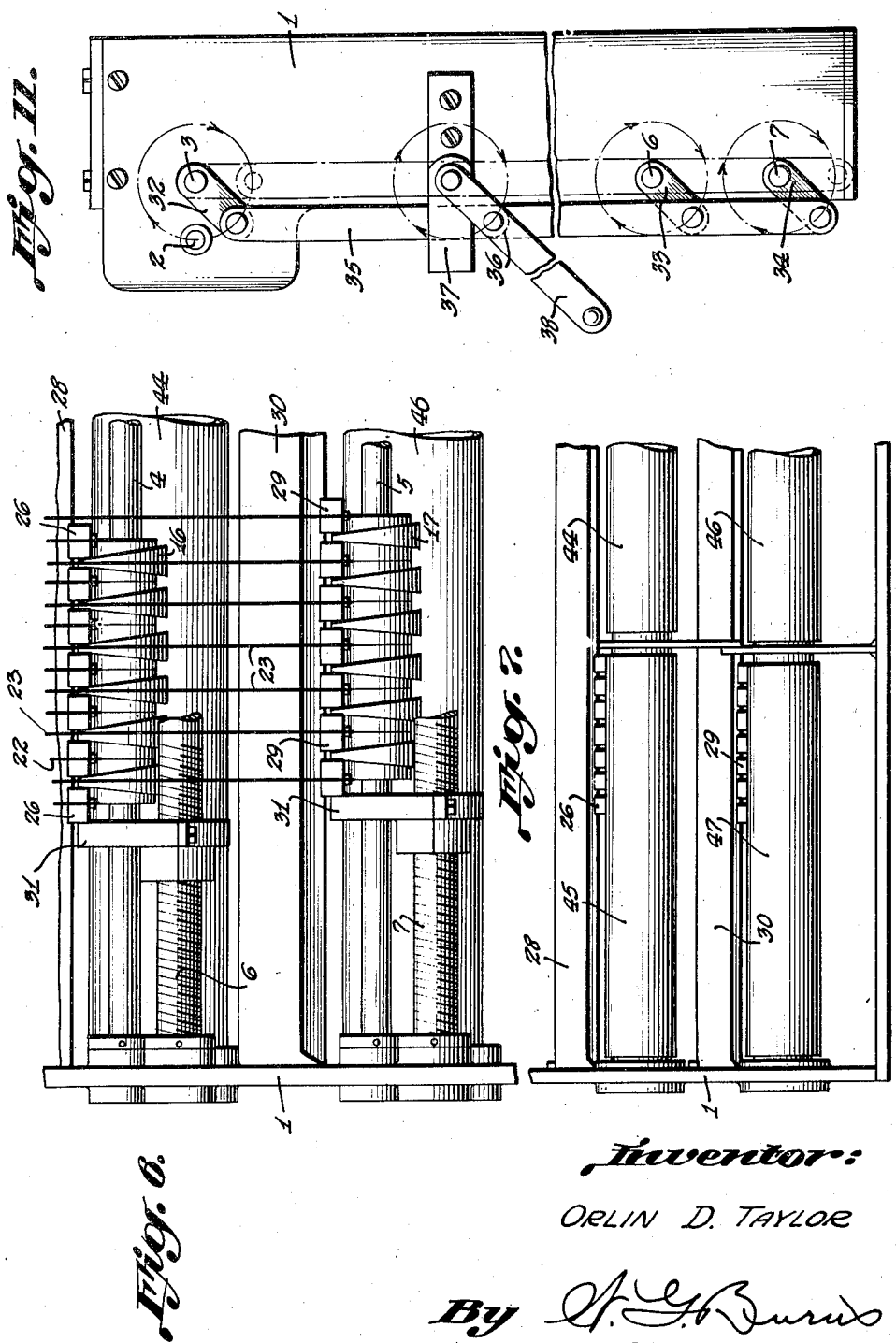
Inventor:
ORLIN D. TAYLOR
By [signature]
Attorney Sept. 24, 1940.    O. D. TAYLOR    2,216,103
BREAD SLICING MACHINE
Filed Nov. 28, 1938    4 Sheets-Sheet 4
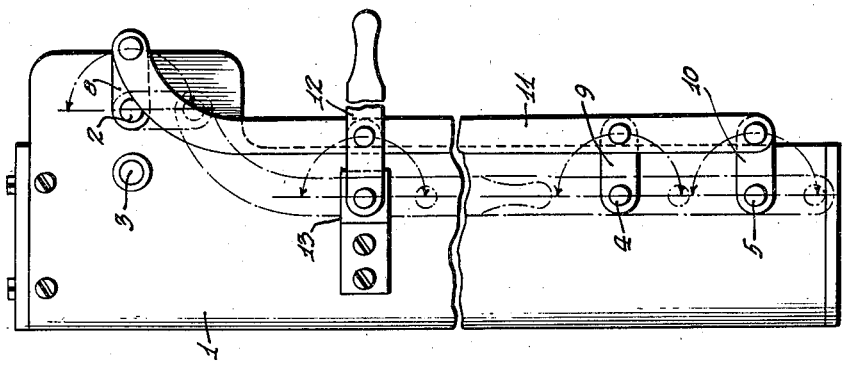
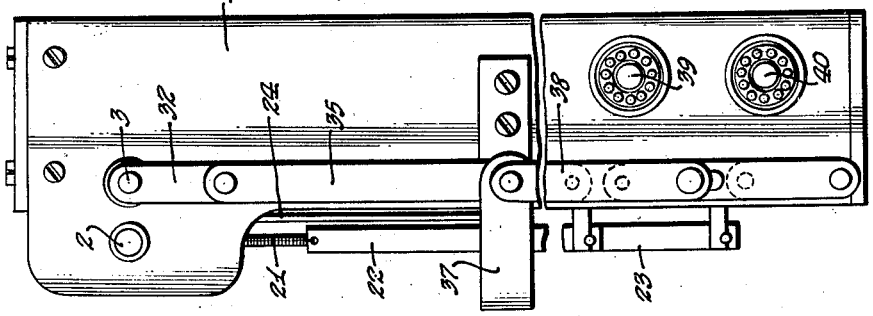
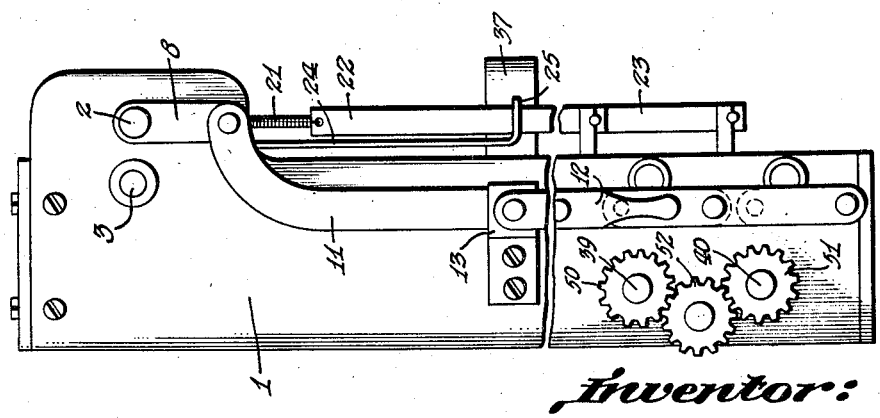
Inventor:
ORLIN D. TAYLOR
By A. G. Burns
Attorney Patented Sept. 24, 1940

2,216,103

UNITED STATES PATENT OFFICE 2,216,103

BREAD SLICING MACHINE

Orlin D. Taylor, Ossian, Ind., assignor of one-third to Mary Shafer, Bluffton, Ind.

Application November 28, 1938, Serial No. 242,717

7 Claims. (Cl. 146—153)

This invention relates to bread slicing machines wherein a group of cutting knives are positioned in a machine in parallel relation with each other and spaced apart so that when the knives are reciprocated alternately in opposite directions and a loaf of bread is fed to the machine the entire loaf is severed into numerous uniform slices without distortion of its general form.

Another object of the invention is to afford a machine for reducing a loaf of bread into slices of equal thickness in a single operation thereby to effect rapid and economical operation in the production of pre-sliced loaves.

A further object of the invention is to provide in connection with a bread slicing machine a group of parallel bread slicing knives and operating means therefor, and mechanism whereby to effectively adjust and sustain the knives in predetermined equally spaced apart positions.

And a still further object of the invention is to provide in a bread slicing machine a mechanism for spreading its knives in equal distances apart, and also a recovery mechanism whereby to return the group of knives to their contracted positions after having been spread apart, without disturbance of their parallelism.

Other objects and advantages of the invention appear in the following description.

An illustrative embodiment of the invention is shown in the accompanying drawings, in which:

Fig. 1 is a front elevation of the machine in which the invention is incorporated, a portion thereof being broken away;

Fig. 2 is a transverse section of Fig. 1 approximately on the line 2—2 thereof;

Fig. 3 is a fragmentary rear view of the upper portion of the machine drawn upon an increased scale;

Fig. 4 is a detail side view of a floating cylinder forming part of the knife-actuating mechanism, a portion being broken away;

Fig. 5 is an end view projected from Fig. 4, and including a supporting eccentric therefor;

Fig. 6 is a fragmentary front view of the knife-actuating mechanism and the adjustable spacing mechanism therefor, the view being upon an enlarged scale;

Fig. 7 is a fragmentary rear view of the same drawn upon a reduced scale;

Fig. 8 is a left-hand end view of the machine, a portion thereof being broken away;

Fig. 9 is a right-hand end view of the machine, a portion thereof being broken away;

Fig. 10 is another view of the left-hand end of the machine partially broken away, showing the operating lever and bus-bar for actuating the spacing cam-shafts in midadjusted position;

Fig. 11 is another right-hand end view of the machine showing the operating lever and bus-bar for actuating the recovery mechanism, in a partially advanced position;

Fig. 12 is a fragmentary side view showing a group of the upper cams for spreading the knife carriers;

Fig. 13 is a detail side view of a stop cam on the upper unit of the spacing mechanism; and Figs. 14 and 15 are fragmentary side views of the two lower cam units on the spacing mechanism.

The illustrative embodiment of the invention consists of a frame 1 having mounted therein in the upper part thereof a cam-supporting shaft 2 and a recovery member including a threaded or recovery shaft 3, and in the lower part of the frame are disposed other cam-supporting shafts 4 and 5, located one above the other, and also complemental threaded recovery shafts 6 and 7.

Knife spacing mechanism

Mechanism is provided for synchronous adjustments of the cam-supporting shafts 2, 4 and 5, which consists of cranks 8, 9 and 10 that are secured respectively on the outer ends of the cam-supporting shafts 2, 4 and 5, each of which is connected pivotally with an actuating bus-bar 11, and said bus-bar has connection with an operating lever 12 that is pivoted on a bracket 13 on the frame 1, and also has pivotal connection with the bus-bar 11 whereby all of the cam-supporting shafts are adjustably rotated equally in one direction or the other upon manipulation of said lever.

Upon the shaft 2, approximately midway between its ends, is permanently secured a cam-member 14, and also on said shaft are splined two groups of axially movable cams 15 (one of which groups is omitted from the drawings). Also, upon each of the shafts 4 and 5 are mounted a corresponding series of splined cams 16 and 17.

The end faces of all of the cams are convergent with respect to each other and all of the cams are positioned upon their respective shafts uniformly so that the convergency of their cam faces at all stages of angular adjustment are directed alike.

In the frame is disposed a knife-carrier guide consisting of two beams 18 spaced apart from each other, and between said beams are positioned a series of knife-carriers 19 that are laterally movable in the space between said beams. The carriers are preferably made square in cross-section to prevent axial rotation thereof, and are each provided with a pin 20 in its upper portion the ends of which pin overhang the top faces of the beams 18 upon which they have sliding movement. Thus the carriers are held suspended between the beams and have lateral adjustable movement thereto. The upper ends of the carriers 19 project into the spaces between the corresponding cams 15 so that upon turning of the cams the carriers become spread apart more or less accordingly.

Coincidentally with the spreading of the carriers the cams 15 have axial spreading movement (Fig. 12) with respect to their shaft 2 on which they are splined which movement is due to the lateral movement of the carriers against the adjacent cam. In this manner the carriers become equally spaced apart from each other. Each carrier has secured thereto a pendent retracting spring 21 upon the lower end of which is removably secured one end of a knife 22—23 in the form of a thin blade, and also secured to the lower portion of each carrier is a pendent guide 24 having a lower slotted arm 25 through which the corresponding knife has longitudinal movement.

The lower ends of the knives 22 are removably connected respectively to the outer ends of corresponding rock-bars 26 preferably by means of laterally extending lugs 27 on the knives that underlie the rock-bars which are notched for their reception. The group of rock-bars 26 are arranged so as to pass between the adjacent cams 16 and bear upon the hubs thereof, and a fulcrum bar 28 is disposed in the frame of the machine so as to bear upon the rock-bars and hold the same in operative position on said cams. The lower ends of the blades 23 are similarly connected to the outer ends of other rock-bars 29 that are positioned on the cams 17 and are held in such position by a corresponding fulcrum bar 30 as in the former instance. Upon adjustably turning the cams 16 and 17 the corresponding rock-bars 26—29 become spread apart more or less accordingly.

In order to preserve parallelism of the knives it is desirable that the groups of cams 15, 16 and 17 be simultaneously adjusted so that the carriers 19 and the rock-bars 26 and 29 have spreading movement uniformly in extent. This is accomplished by manipulation of the operating lever 12 previously described.

*Recovery mechanism*

There is provided mechanism for uniformly moving the knives back into close formation after having been expanded apart, or into any desired intermediate spaced relation thereof. The opposite ends of the recovery shafts 3, 6 and 7 are respectively right and left-hand threaded and have mounted thereon corresponding threaded followers 31. (Figs. 1, 3 and 6). Upon rotation of said recovery shafts the followers on the corresponding ends thereof are moved uniformly toward or from each other according to the direction and extent of rotation of said shafts. Outward movement of the followers 31 permits corresponding outward movement of the knife-carriers 19 and the rock-bars 26 and 29 by turning of the cams 15, 16 and 17. Also, upon turning of said cams reversely and subsequent inward adjustment of the followers, said knife-carriers and the rock-bars are correspondingly moved inwardly by mechanical force of the carriers against the knife-carriers and rock-bars. Thus, when the knives are in contracted position and the followers are adjusted to their innermost positions the carriers and rock-bars are confined to their innermost positions thereby, or upon adjustment of the followers outwardly to any selected position, the carriers and rock-bars may then be moved outwardly in proper spaced relation with each other to a corresponding extent by adjustment of the cams with which they are operatively associated.

The recovery shafts 3, 6 and 7 are actuated simultaneously by means of a mechanism therefor provided consisting of cranks 32, 33 and 34 secured on the outer ends of the corresponding recovery shafts, and a bus-bar 35 that is connected to the outer ends of said cranks and actuated by an operating member consisting of a crank 36 pivoted in a bracket 37 and connected with a manually-operated crank 38. As the crank 38 is turned, the recovery shafts are uniformly turned through the medium of the bus-bar 35 and cranks on said recovery shafts. In this manner the carriers are simultaneously moved to the same extent inward or outward accordingly as the manually operated crank is actuated, whereby is controlled the spacing adjustment of the knife-carriers and the rock-bars.

*Driving mechanism*

The rock-bars and the knives 22—23 connected respectively therewith are moved downwardly in opposition to restraint of the contracting springs 21 that connect said knives with the corresponding knife-carriers by mechanism therefor provided. Said mechanism consists of parallel drive-shafts 39 and 40 journaled in the frame I upon each of which are mounted eccentrics 41–42 (Figs. 2–4) preferably provided on the perimeters with roller bearings 43. The eccentrics on each shaft are arranged in pairs, one pair 41 being secured on the shaft 39 so that its preponderance is positioned 180 degrees from the preponderance of the other pair 42 (Fig. 2), and upon each pair of eccentrics are mounted for rotation thereon corresponding tubes 44—45 upon which the rear ends of the adjacent rock-bars 26 bear. As the drive-shafts are rotated the tubes are gyrated through the medium of their eccentrics, whereupon the rock-bars bearing on said tubes are actuated. The eccentrics 41 and 42 are similarly arranged upon the drive-shaft 40 and have mounted on the respective pairs of eccentrics corresponding tubes 46—47 upon which the rear ends of the adjacent rock-bars 29 bear, so that upon rotation of the drive-shaft 40 the rock-bars 29 are accordingly actuated as in the former instance.

The purpose of securing the eccentrics in pairs in opposite position is to cause alternate movement with respect to the groups of rock-bars actuated thereby thus to balance the momentum of one group of rock-bars as against the other group during operation of the machine. Also, the eccentrics 41 and 42 on the shaft 39 are disposed oppositely with respect to the corresponding eccentrics on the drive-shaft 40 so that the knives 22—23 are actuated alternately, viz: the alternate knives are caused to move longitudinally in opposite directions. Thus, when a loaf of bread is fed against the knives the drag thereof in slicing the loaf, being in opposite directions is counterbalanced which circumvents crushing of the loaf.

The drive-shafts 39 and 40 are each provided upon an extending end thereof with gears 50—51 that mesh with an intermediate gear 52, and said gears are actuated by a drive-pulley 53 connected therewith which is adapted to be driven by a belt connected with a suitable source of power (not shown).

*Operation*

In use, upon turning of the drive-pulley, the knives are set in longitudinal reciprocating motion through the medium of the actuating mechanism therefor, the movement of the alternate knives being in opposite directions. A loaf of bread is suitably applied as in the usual manner to the knives while in motion, whereupon the loaf is sliced during its passage through the spaces between the knives. When it is desired to increase the thickness of the slices, the followers 31 are first moved outwardly by turning of the recovery shafts 3, 6 and 7 which is accomplished by manipulating the operating crank 38. The cams 15, 16 and 17 are then adjusted uniformly by turning the cam shafts 2, 4 and 5 which is accomplished by manipulating the operating lever 12, whereupon the knife carriers 19 and the rock-bars 26 and 29 are moved equally spaced apart. After the knives have been adjusted to the desired spacing, the followers are then moved inwardly against the corresponding endmost cams thus causing the knife-carriers and rock-bars to be confined in the positions to which they have been adjustably moved by action of the corresponding cams.

After the knives become dulled they may readily be removed by disconnecting them individually from their corresponding retracting springs 21 and rock-bars to which the lower ends of the knives are attached. The knives are then sharpened and replaced in the machine, or new knives are applied in similar manner.

By this construction is attained an advantage of having few parts that have movement during operation of the machine, thus an economy in the consumption of power required to operate the machine is effected.

A valuable feature of the invention is in the particular construction of the driving mechanism for the rock-bars wherein there are provided the floating tubes 44, 45, 46 and 47 that are rotatably supported upon their driving eccentrics. By this arrangement friction between the driving mechanism and the driven rock-bars is substantially eliminated thereby obviating the necessity of the use of lubrication that ordinarily in machines of this character is detrimental because of liability of the lubricant to taint the loaves.

Variations from the particular construction above disclosed may readily be made by exercise of engineering skill without departure from the spirit or scope of the invention, and the following claims are intended to be inclusive of such variations.

What I claim is:

1. A bread slicing machine constituted of a supporting frame, a series of rotatable cam shafts, a corresponding series of rotatable recovery shafts the ends of which are oppositely threaded, said recovery shafts being mounted in said frame adjacent the corresponding cam-shafts, means for angularly adjusting said cam shafts simultaneously, mechanism for simultaneously rotating said recovery shafts uniformly, a series of cams splined on each of said cam shafts, a series of knife-carriers provided with supporting means therefor in the frame adapted to permit lateral movement of said carriers and hold said carriers in operative connection with corresponding cams on one of said cam-shafts, each carrier having a pendent retracting spring; groups of rock-bars engaged respectively with the corresponding cams on the other cam shafts, the rock-bars of each group being provided with fulcrum bars in the frame for holding same in operative position, driving mechanism for actuating said groups of rock-bars alternately, a series of knives the ends of which are removably connected respectively with said springs and the corresponding rock-bars, guides for said knives movable with said carriers, and followers on the threaded ends of said recovery shafts so arranged that upon rotation of the recovery shafts, said knife-carriers and rock-bars are engaged by the corresponding followers and moved toward their contracted positions.

2. In a bread slicing machine, a supporting frame, a rotatable cam-shaft supported in said frame, a recovery shaft, the ends of which are oppositely threaded, rotatably mounted in said frame adjacent said cam-shafts, a series of cams splined on said cam-shaft, a series of knife-carriers provided with means secured in said frame for supporting said carriers in operative connection with said cams arranged to permit lateral movement of said carriers upon angular adjustment of said cams, a retracting spring pendently connected with each of said carriers, a corresponding series of knives the upper ends thereof having connection respectively with the corresponding springs, guides for said knives movable with said carriers, actuating mechanism operatively connected with the lower ends of said knives so constituted as to cause longitudinal movement of said knives alternately in opposition to restraint of said springs, followers on said recovery shaft for moving said carriers and cams into contracted position upon rotation of said recovery shafts, and means in connection with said actuating mechanism cooperatively connected with said recovery shaft whereby to move the lower ends of the knives into contracted positions correspondingly with the contracted positions of said carriers.

3. In a bread slicing machine having groups of knives and mechanism for reciprocating the alternate knives in said groups relatively in opposite directions, a mechanism having members connected with said knives at the opposite ends thereof consisting of laterally adjustable knife-carriers provided with contracting springs that are attached respectively to the upper ends of said knives and actuating rock-bars removably connected respectively to the opposite ends of said knives, guides movable with said carriers for said knives, mechanism mounted in the frame of said machine having operative connections with said carriers and rock-bars whereby to adjustably space said carriers uniformly apart from each other and concurrently space said rock-bars correspondingly apart from each other, and another mechanism adapted to uniformly move said carriers and rock-bars into contracted position.

4. In a bread slicing machine having groups of knives and mechanism for reciprocating the alternate knives in said groups relatively in opposite directions, a mechanism having members connected with said knives at the opposite ends thereof consisting of laterally adjustable knife-carriers provided with contracting springs that are attached respectively to the upper ends of said knives and actuating rock-bars removably connected respectively to the opposite ends of said knives, mechanism mounted in the frame of said machine having operative connections with said carriers and rock-bars whereby to adjustably space said carriers uniformly apart from each other and concurrently space said rock-bars correspondingly apart from each other, and another mechanism adapted to uniformly move said carriers and rock-bars into contracted position.

5. In a bread slicing machine having a group of parallel knives mounted to have longitudinal reciprocating movement alternately in relative opposite directions, knife-carriers connected with said knives respectively that have lateral adjustable movement attached to the upper ends of said knives, rock-bars removably connected with the lower ends of the respective knives having actuating means in connection therewith, rotatively adjustable shafts supported in the frame of the machine provided respectively with members for adjustably spacing apart from each other the corresponding carriers and rock-bars, and a mechanism having adjustably movable followers thereon engageable with the endmost of said carriers and rock-bars whereby to move said carriers and rock-bars into contracted position.

6. In a bread slicing machine, a frame, a group of parallel knives in said frame having longitudinal reciprocating movement alternately in relative opposite directions, knife-carriers and mechanically operated rock-bars connected with the respective opposite ends of said knives, mechanism having operative connections with said carriers and rock-bars whereby to adjustably space said carriers uniformly apart from each other and concurrently space said rock-bars correspondingly apart from each other, and another mechanism operatively engageable with said carriers and rock-bars for moving same into contracted position.

7. In a bread slicing machine, a group of parallel knives, laterally adjustable knife-carriers supported in the frame of said machine provided with corresponding retracting springs connected with the corresponding knives, guides movable with said carriers for said knives, mechanically-operated means for reciprocating said knives alternately in relatively opposite directions, adjusting means having operable connections with said carriers whereby to uniformly space said knives apart from each other, and another mechanism operatively connected with said carriers provided with actuating mechanism therefor whereby to contract said knives into uniform spaced positions.

ORLIN D. TAYLOR.